April 16, 1946.　　C. W. CRUMRINE　　2,398,412

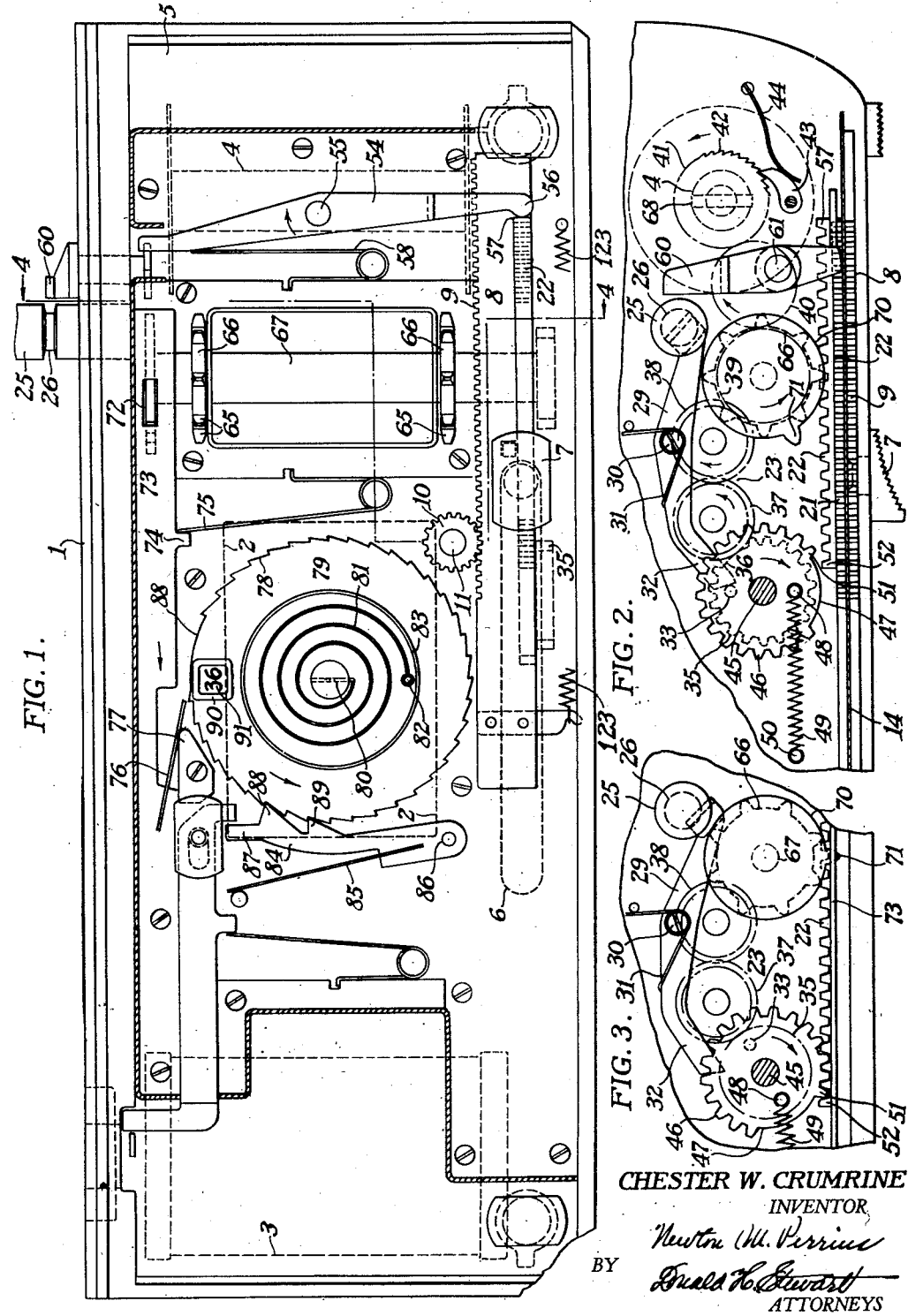

CAMERA FILM WIND AND SHUTTER CONTROL MECHANISM

Filed Nov. 10, 1944　　3 Sheets-Sheet 2

CHESTER W. CRUMRINE
INVENTOR

BY Newton M. Perrins
Donald H. Stewart

ATTORNEYS

April 16, 1946. C. W. CRUMRINE 2,398,412
CAMERA FILM WIND AND SHUTTER CONTROL MECHANISM
Filed Nov. 10, 1944 3 Sheets-Sheet 3
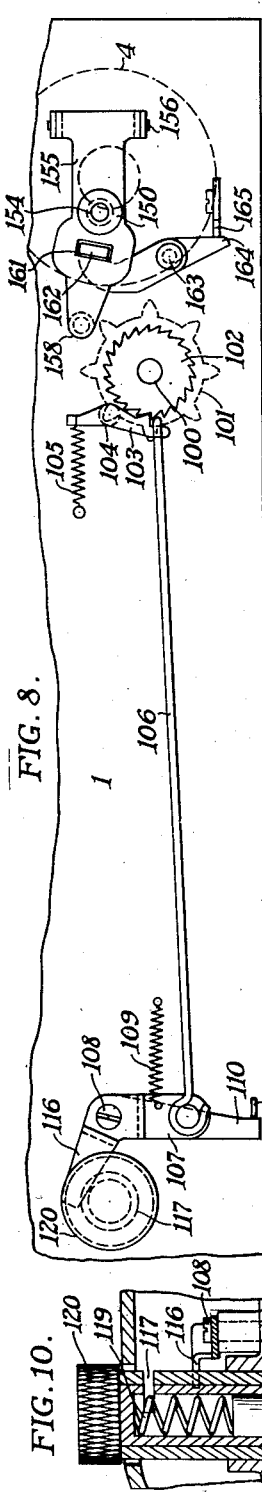
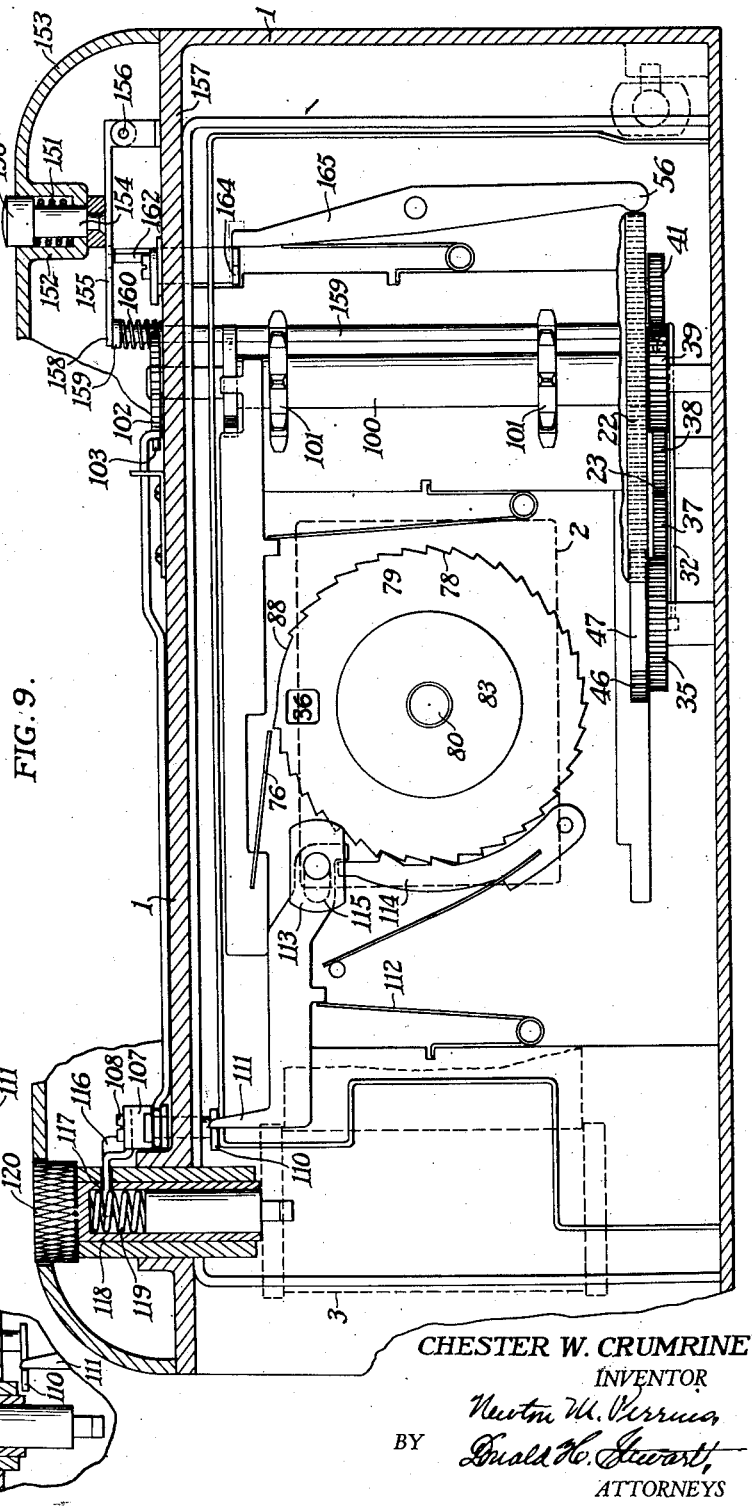
CHESTER W. CRUMRINE
INVENTOR
BY
ATTORNEYS Patented Apr. 16, 1946

2,398,412

UNITED STATES PATENT OFFICE 2,398,412

CAMERA FILM WIND AND SHUTTER CONTROL MECHANISM

Chester W. Crumrine, Rochester, N. Y., assignor to Eastman Kodak Company, Rochester, N. Y., a corporation of New Jersey Application November 10, 1944, Serial No. 562,760

10 Claims. (Cl. 95—31)

This invention relates to photography and more particularly to photographic cameras of the roll holding type. One object of my invention is to provide a camera with a film winding mechanism which can be quickly and easily operated. Another object of my invention is to provide a film winding mechanism which will greatly reduce, if not completely eliminate, double exposures. Another object of my invention is to provide a film winding mechanism in which the winding operation must be completed before a shutter trigger can be released. Another object of my invention is to provide a lock for the shutter trigger which will be released only after the film winding mechanism has been completed. Other objects will appear from the following specification, the novel features being pointed out in the claims at the end thereof.

Coming now to the drawings in which like reference characters denote like parts throughout:

Fig. 1 is a fragmentary sectional view showing parts in elevation of a camera having a film winding mechanism and a shutter releasing mechanism constructed in accordance with and embodying a preferred form of my invention;

Fig. 2 is a fragmentary detail plan view showing parts of the film winding and trigger controlling mechanism shown in Fig. 1;

Fig. 3 is a fragmentary detail view showing parts of the mechanism of Fig. 2, but in a different position;

Fig. 8 is a fragmentary top plan view showing parts of a film rewinding mechanism and a shutter latching mechanism constructed in accordance with a second preferred form of my invention;

Fig. 9 is a view similar to Fig. 1 but of the second preferred embodiment of my invention; and Fig. 10 is a fragmentary detail sectional view showing the film rewinding knob in an operative relation.

Figure 4:
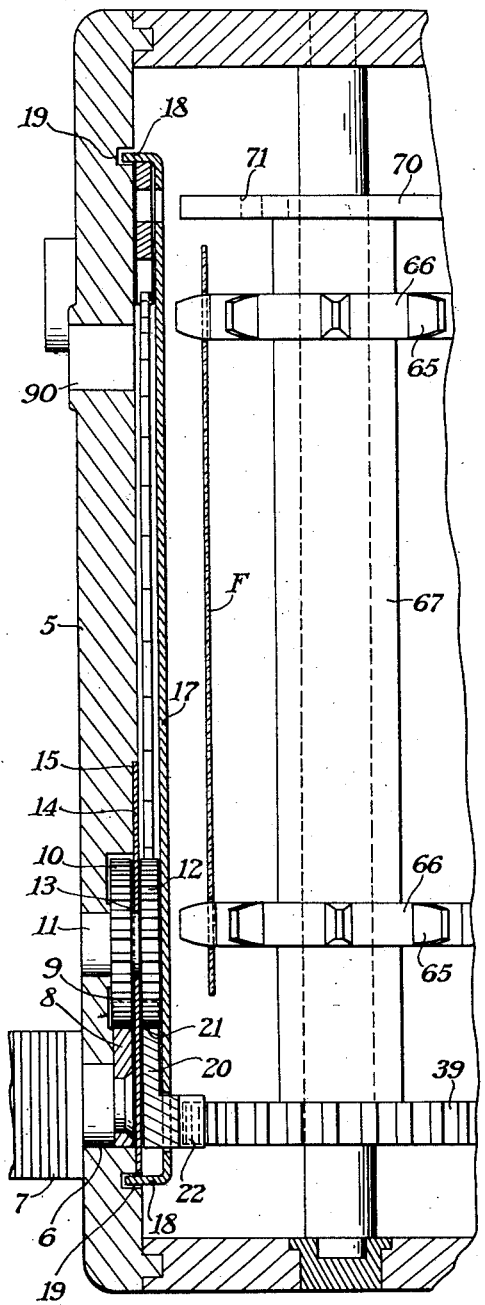
Fig. 4 is an enlarged fragmentary sectional view taken on line 4—4 of Fig. 1.

It has been proposed to provide cameras with a film winding mechanism mounted on the camera back so that these mechanisms could be operated by means of an operator's thumb or finger while holding the camera in a picture-taking position at eye elevation. Such cameras have sometimes employed slides moving through slots in the camera back, but in most instances such cameras have also employed a claw mechanism for moving perforated film.

In my present invention I have provided a camera of this type, but I have provided additional safeguards against light entering the camera back and I have provided a mechanism which will wind film through the engagement of a sprocket with perforated film and which will also turn a take-up film spool.

Referring to Fig. 1, I may apply this winding mechanism to a camera 1 which may have spool chambers of the usual type on both sides of an exposure frame 2. The two spool chambers at each end of the exposure frame 2 are arranged to receive perforated film preferably of the motion picture film type in which the film is supplied in a retort 3 from which the film is unwound upon a film winding shaft 4 until all the exposures have been made, after which the film is rewound in the retort 3.

In order to quickly wind the film after each exposure and in order to accurately measure the amount of film wound, I have provided the following structure which I prefer to mount chiefly on the camera back as illustrated in Fig. 1. The camera back is slotted at 6 so that a knob or handle 7 can be moved across the slot to wind film in a single stroke.

The handle 7 is attached to a rack 8 having teeth 9 adapted to mesh with a gear 10 carried by a shaft 11 as best shown in Fig. 4. The shaft 11 also carries a second gear 12 preferably of the same size and of the same number of teeth. The shaft 11 passes through an aperture 13 in a light guard plate 14 which may be mounted in a recess 15 in the camera back 5. Thus the slot 6 through which the handle 7 passes is not only covered by the rack 8 but it is also covered by the plate 14 which forms a light-tight cover to prevent a film F carried by the camera from being accidentally light struck. In addition to the light guard plate 14 there is a second light guard plate 17 which has inwardly flanged edges 18 engaging grooves 19 in the camera back to form a light-tight connection therewith.

The gear 12 meshes with a second rack 20 which has two sets of teeth 21 and 22 preferably arranged at right angles to each other. The teeth 21 mesh with the gear 12 and the teeth 22 are for connecting a winding gear train designated broadly as 23 with a film winding shaft 4.

Figure 7:
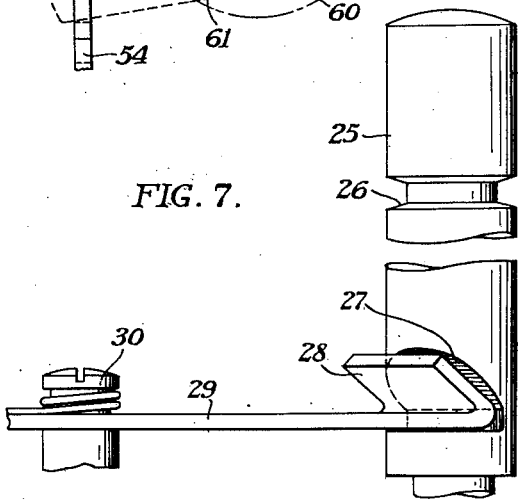
Fig. 7 is a fragmentary detailed view showing the side elevation of parts of the gear train release.

This is accomplished in the following manner. The rack 8 is, of course, moved whenever the handle 7 is moved and this rack is normally held by means of a spring 123 in a position of rest as shown in Fig. 1. Fig. 2 illustrates the position of the parts after the film has been wound and when the camera is in position to take a picture. The camera shutter (not shown) may be operated by a trigger 25 which may be grooved at 26 and which may extend downwardly through the wall of the camera 1 into a position to operate the camera shutter. The trigger 25, in addition to the notch 26, is provided with an angularly shaped notch 27 which is positioned to engage the upwardly turned end 28 of a gear release latch 29 as best shown in Fig. 7. The latch 29 may be pivoted upon a stud 30 and I provide a spring 31 which tends to turn this latch in the direction shown by the arrow in Fig. 2 which turns the upturned end thereof 28 toward the trigger 25. However, when the trigger 25 is depressed the notch 27 and upturned end 28 cam the lever 29 against the action of the spring and into a position shown in Fig. 3 in which position the latching end 32 of the lever has been removed from the position in Fig. 2 in which it engages a pin 33 on one of the gears 35 of the gear train. Gear 35 is provided with teeth throughout the major part of its periphery but several teeth have been removed at 36 leaving a mutilated area which will permit a second gear 37 of the gear train to lie out of mesh with the gear 35. The winding handle 7 may be connected to the gear 37 through gears 38, 39, 40 and 41 and the last-mentioned gear may carry a ratchet 42 engageable by a pawl 43 pressed by a spring 44 into engagement with the ratchet to normally prevent reverse winding of the key wind shaft 4.

The gear 35 is carried by a shaft 45 which also carries a second gear 46 which is preferably keyed to the shaft 45. Gear 46 is provided with a mutilated portion 47 so that when the gears 35 and 46 are held in the position shown in Fig. 2 by means of the latching end 32 of the latch 29 the mutilated portion 47 will lie above the rack 22.

A pin 48 on the gear 46 is attached to a spring 49 anchored on a pin 50 so that as soon as the latch 29 is moved to release the pin 33 the gears will turn in the direction shown by the arrow. This movement will cause the first tooth 51 past the mutilated area 47 to engage the first tooth 52 of the rack 22. The mechanism is conditioned for winding film through movement of the rack 22 when the handle 7 is moved.

When the rack is moved so that the handle 7 crosses the slot 6, one full stroke will wind a fresh area of film into place. However, if an operator should only move the handle part way, the spring 123 would be unable to pull the rack back to its initial position of rest because of the pawl and ratchet 42 and 43 which is interconnected with the rack 22 through the gear train broadly designated as 23. Thus, it is necessary to complete the stroke of the rack 7 and by completing this stroke the spring 49 is placed under tension so that towards the end of the stroke the gears are moved until the pin 33 strikes the stop 32 in which position the gears 35 and 46 are disconnected both from the rack 22 and from the gear train 23. When this occurs it is possible to move the handle 7 back and forth without in any way affecting the mechanism, and as soon as the handle 7 is released the spring 123 will restore the rack to its Fig. 2 position.

Figure 5:
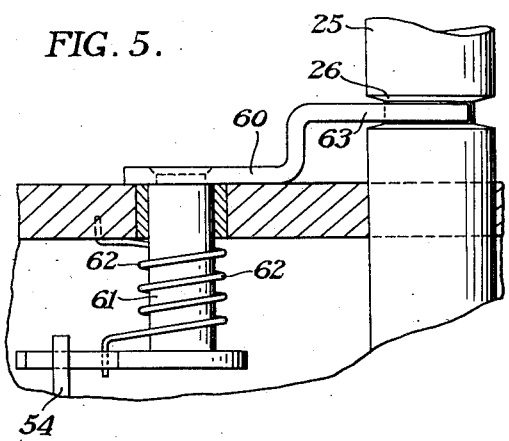
Fig. 5 is an enlarged fragmentary sectional view, the parts being shown in elevation of the trigger lock mechanism.
Figure 6:
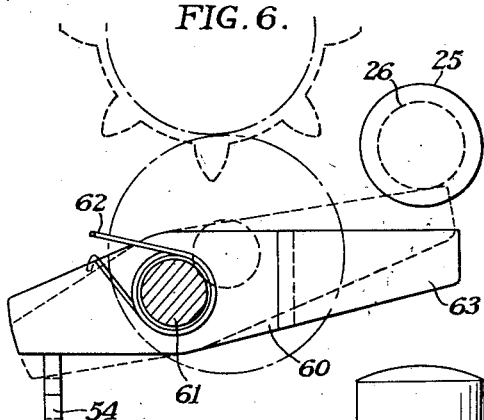
Fig. 6 is a fragmentary plan view showing the trigger lock of Fig. 5.

In order to prevent the trigger 25 from being operated before the film has been wound, I provide a lever 54 pivoted upon a stud 55 and having one end 56 normally lying in the path of one end 57 of the rack 22. A spring 58 tends to turn the lever 54 in the direction shown by the arrow in Fig. 1. Consequently, as soon as the rack 22 moves to the left with respect to Fig. 1 the spring causes the lever to move in a clockwise direction so that a second lever 60 may be spring pressed about its pivot 61 into engagement with the trigger 25 as best shown in Fig. 6. The spring 62 for moving this lever may encircle the shaft 61. With the lever 60 pressed against the trigger 25, as soon as the trigger 25 is depressed the slot 26 will come opposite the end 63 of the lever 60 and it will move from its full line to its broken line position in Fig. 6. Fig. 5 also shows the lever end 63 in a locking position in the trigger slot 26. In this depressed and latched position the trigger cannot be operated and it will remain in this position until film has been wound and until the rack 22 is moved to its Fig. 1 position. Each time the rack tooth 57 strikes and moves the lever end 56 it will cause the second lever 60 to move out of the slot 26, thus freeing the trigger for a second actuation.

The position of the slot 26 in the trigger 25 is so selected that the turned up end 28 and the cam face 27 of the trigger will move lever 29 from the Fig. 7 position to release the latch end 32 from the pin 33 just as the shutter trigger is operated and by that time the slot 26 will be in alignment with the lever 63 which will then latch the trigger in place.

With the construction described above, it is necessary for an operator to completely wind film before the trigger can be operated because unless the last tooth 57 of rack 22 returns to its Fig. 1 position to release the trigger latch 60, the trigger will remain latched. Moreover, if the operator starts to move the handle 7 but fails to complete this movement, the handle will remain in its partially moved condition in the slot 6 and cannot move in a reverse direction until this is permitted by the gears 35 and 46 having been moved one complete revolution.

The film F passes the usual type of exposure frame 2 and is wound preferably by means of sprocket teeth 65 carried by the sprocket wheels 66 affixed to a sleeve shaft 67, this shaft being connected to and turned by one of the gears 39 of the gear train 32. In order to make up for the varying diameter of the take-up spool on shaft 4 a known type of slip clutch may be placed between this shaft which is rotated by the gear 41 and a winding key 68 which turns the spool. This slip clutch construction is not new.

In order to measure the number of exposures of film, I prefer to provide a one-toothed sprocket 70 on the end of the sleeve 67, the tooth 71 of this sprocket being adapted to engage in an aperture 72 in a slide 73 as shown in Fig. 1. This slide carries a lug 74 pressed by a spring 75 in the direction shown by the arrow. The slide carries a spring finger 76 which normally rests in an inoperative position upon a guide 77, but when this slide is moved to the right of Fig. 1 the spring finger 76 will engage a tooth 78 of a ratchet 79 mounted upon a shaft 80 and carrying a spring 81 between the shaft 80 and a pin 82 in a spring cover 83. This spring tends to turn the ratchet in the direction shown by the arrow in Fig. 1 but each time the ratchet is moved by the spring pawl 76 a double-toothed pawl 84 holds the ratchet wheel against rearward movement. The pawl 84 is pressed by a spring 85 in contact with the ratchet as the pawl tends to turn about its pivot 86. The pawl carries an upstanding arm 87. Two teeth 88 and 89 are provided on the pawl because, since it is necessary to remove several teeth of the ratchet wheel 79 as shown by the mutilated portion 88 in Fig. 9, there must be one tooth 88 or 89 always in engagement with a ratchet tooth 78 to hold it in a set position.

The reason for having a mutilated portion 88 as shown in Fig. 9 is that when the film is completely wound an additional movement of the slide 73 will cause the spring pawl 76 to pass idly over the ratchet 79 without moving it.

By merely glancing through the window 90, as indicated in Fig. 1, the exposure number (here shown by the character 91) can be read through the window.

Assuming that all of the film has been wound it will next be necessary to rewind the film. In the second embodiment of my invention shown in Figs. 8-10, inclusive, it will be noticed that the one-way clutch for preventing reverse winding of the film is moved from the position shown in Fig. 2 of the film winding shaft 4 to the position shown in the last three figures. In these figures the shaft 100 supports the film sprocket 101 and supports a ratchet wheel 102 with which a pawl 103 cooperates, this pawl being normally turned about its pivot 104 into contact with the ratchet by a spring 105. A rod 106 connects pawl 103 to a lever 107 pivoted at 108 and turned about the pivot by a spring 109. The lever 107 has one end 110 in the path of a release lever 111 which may be moved against the pressure of spring 112 by means of a releasing lever 113. This releasing lever also moves a two-toothed pawl 114 similar to the two-toothed pawl 84 of the first-described embodiment of my invention. When the handle 113 is moved through the slot 115 to the left in Fig. 9, the arm 111 engages the lever arm 110 throwing a latching arm 116 out of a latching groove 117 in a rewind spindle 118. This permits spring 119 to thrust the film winding handle 120 outwardly from its inoperative position of Fig. 9 to its operative position in Fig. 10. At the same time this movement of lever 107 occurs the pawl 103 is withdrawn from the ratchet 102 so that the handle 120 can be turned to wind film in a reverse direction back into the original film retort 3 such as is customary with cameras using a film retort of this type. It should be noticed that when the handle 113 is moved for rewinding the film it likewise releases the two-toothed pawl 114 from the film measuring ratchet 79 enabling the spring 81 to return this ratchet wheel to an initial position. This initial position is preferably made 3 to 4 teeth below the position in which the ratchet shows the first exposure. The reason for this is that the fogged end of the film stretched across the exposure frame 2 and attached to the take-up spool 4 must be wound off before the first exposure is made. However, all the operator needs to do is place the film in the camera and operate the film winding means, watching the window 90 until the numeral 1 appears which will indicate that the camera is ready for the first exposure.

In the form of my invention shown in Figs. 8 and 9 the shutter tripping mechanism is slightly different from the first-described embodiment in that the trigger member 150 is spring pressed upwardly by a spring 151 in a sleeve 152 in a decorative top or cover 153. The trigger carries a shaft 154 resting on lever 155 pivoted at 156 to a camera wall 157 and having a free end 158 positioned to move the shutter release 159 downwardly against the pressure of a spring 160 to operate the shutter. In place of the latching mechanism shown in Figs. 5-7, inclusive, of the first embodiment of my invention, I have provided a rectangular aperture 161 in the lever 155 and there is a slightly smaller rectangular lever 162 carried on a pivot 163 and having an end 164 lying in the path of the lever 165 which is in all respects like the lever 54 of the first-described embodiment of my invention so that it works in an exactly similar manner. In other words, the latch consisting of the arm 162 will permit the trigger 159 to be depressed by the push button 150 only when the two parts are in alignment as shown in Fig. 8. This can only occur when the lever 165 is in the illustrated position. When in this position the shutter may be operated, but after an operator has started to wind film and the lever 165 has moved the arm 162 will not be in alignment with the aperture 161 and, consequently, the trigger cannot be operated because of this misalignment of the arm 162 and the aperture 161.

With both embodiments of my invention it is impossible to depress the shutter trigger until the film has been wound. It is impossible to wind film unless an exposure has been made. It is impossible to incompletely wind film because the winding lever will remain in any position it may assume before a complete winding stroke is made. Thus, double exposures are prevented and the camera parts are restored to an initial position when the film is rewound into the original retort.

While I have described several preferred embodiments of my invention, it is obvious that various other changes may be made without departing from the scope of the appended claims.

What I claim is:

1. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, a pair of connected mutilated gears constituting a first and second mutilated gear for connecting the gear train with the second rack, the mutilated gears being so positioned that the mutilated portion of the second mutilated gear lies opposite a gear of the gear train, being adapted to mesh therewith when the mutilated portion of the first mutilated gear moves away from the second rack.

2. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, a pair of connected mutilated gears constituting a first and second mutilated gear for connecting the gear train with the second rack, the mutilated gears being so positioned that the mutilated portion of the second mutilated gear lies opposite a gear of the gear train, being adapted to mesh therewith when the mutilated portion of the first mutilated gear moves away from the second rack, and a pin carried by the first mutilated gear, movable means engaging said pin for holding the first mutilated gear from meshing with the second rack.

3. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, a pair of connected mutilated gears constituting a first and second mutilated gear for connecting the gear train with the second rack, the mutilated gears being so positioned that the mutilated portion of the second mutilated gear lies opposite a gear of the gear train, being adapted to mesh therewith when the mutilated portion of the first mutilated gear moves away from he second rack, a latch for holding the first mutilated gear in position to clear the second rack, and a spring normally urging the first mutilated gear against the latch and into mesh with the second rack.

4. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, a pair of connected mutilated gears constituting a first and second mutilated gear for connecting the gear train with the second rack, the mutilated gears being so positioned that the mutilated portion of the second mutilated gear lies opposite a gear of the gear train, being adapted to mesh therewith when the mutilated portion of the first mutilated gear moves away from the second rack, a latch for holding the first mutilated gear in position to clear the second rack, and a spring normally urging the first mutilated gear against the latch and into mesh with the second rack, said spring likewise tending to mesh the second mutilated gear and an adjacent gear of the gear train for operatively connecting the film winding spindle and said first rack.

5. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, a pair of connected mutilated gears constituting a first and second mutilated gear for connecting the gear train with the second rack, the mutilated gears being so positioned that the mutilated portion of the second mutilated gear lies opposite a gear of the gear train, being adapted to mesh therewith when the mutilated portion of the first mutilated gear moves away from the second rack, a latch for holding the first mutilated gear in position to clear the second rack, and a spring normally urging the first mutilated gear against the latch and into mesh with the second rack, and a camera trigger operatively connected to the latch whereby said spring may connect said gearing after the trigger is released.

6. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, a pair of connected mutilated gears constituting a first and second mutilated gear for connecting the gear train with the second rack, the mutilated gears being so positioned that the mutilated portion of the second mutilated gear lies opposite a gear of the gear train, being adapted to mesh therewith when the mutilated portion of the first-mentioned mutilated gear moves away from the second rack, a latch for holding the first mutilated gear in position to clear the second rack, and a spring normally urging the first mutilated gear against the latch and into mesh with the second rack, and a camera trigger operatively connected to the latch whereby said spring may connect said gearing after the trigger is released, a notch in the trigger, a trigger latch spring pressed toward the notch in the trigger and means under the control of the second latch for releasing the spring latch only when the film winding stroke of the rack is completed.

7. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, two coaxially arranged connected mutilated gears for connecting and disconnecting the rack and gear train, one gear adapted to mesh with the rack and the other gear adapted to mesh with a gear of the gear train, the mutilated portions of both gears being positioned to simultaneously disconnect one gear from the rack and the other gear from the gear train.

8. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, two coaxially arranged connected mutilated gears for connecting and disconnecting the rack and gear train, one gear adapted to mesh with the rack and the other gear adapted to mesh with a gear of the gear train, the mutilated portions of both gears being positioned to simultaneously disconnect one gear from the rack and the other gear from the gear train, an eccentric pin carried by one coaxial gear, a spring tending to turn the gear in a direction to mesh with said rack, and a latch for engaging said eccentric pin for restraining turning movements of the gear.

9. In a roll holding camera, the combination with a camera body including an exposure frame and two spool chambers, of a slotted back for the camera, a slide movably mounted on the camera back including a first rack, a gear meshing with the first rack, a light guard plate covering said slot in the camera back, a shaft carrying said gear and passing through the light guard plate, a second gear carried by the shaft, and a second rack meshing with the second gear, film winding mechanism comprising a film winding spindle and gearing between the spindle and second rack including a gear train, two coaxially arranged connected mutilated gears for connecting and disconnecting the rack and gear train, one gear adapted to mesh with the rack and the other gear adapted to mesh with a gear of the gear train, the mutilated portions of both gears being positioned to simultaneously disconnect one gear from the rack and the other gear from the gear train, a spring tending to mesh one coaxial gear and the rack, a latch restraining the said gear from such movement, a shutter trigger, and means operable by the trigger for releasing said latch.

10. A shutter according to claim 9 in which there is a mechanism between the said rack and the shutter trigger for preventing movement of the shutter trigger except when said rack is in a predetermined position.

CHESTER W. CRUMRINE.